(12) United States Patent
Raney

(10) Patent No.: US 7,136,747 B2
(45) Date of Patent: Nov. 14, 2006

(54) METHOD FOR GPS CARPOOL RENDEZVOUS TRACKING AND PERSONAL SAFETY VERIFICATION

(76) Inventor: Stephen Raney, 1487 Pitman Ave., Palo Alto, CA (US) 94301

( * ) Notice: Subject to any disclaimer, the term of this patent is extended or adjusted under 35 U.S.C. 154(b) by 139 days.

(21) Appl. No.: 10/905,530

(22) Filed: Jan. 8, 2005

(65) Prior Publication Data

US 2006/0155460 A1 Jul. 13, 2006

(51) Int. Cl.
*G01C 21/00* (2006.01)
*H04Q 7/20* (2006.01)

(52) U.S. Cl. .................. 701/204; 701/117; 701/213; 340/539.12; 342/357.1

(58) Field of Classification Search .................. None
See application file for complete search history.

(56) References Cited

U.S. PATENT DOCUMENTS

| | | | | |
|---|---|---|---|---|
| 6,529,136 B1 * | 3/2003 | Cao et al. | ............... | 340/686.1 |
| 6,774,840 B1 * | 8/2004 | Adamczyk et al. | ...... | 342/357.1 |
| 6,993,490 B1 * | 1/2006 | Chen et al. | ............... | 705/1 |
| 2003/0004776 A1 * | 1/2003 | Perrella et al. | ............... | 705/9 |
| 2003/0125963 A1 * | 7/2003 | Haken | ............... | 705/1 |
| 2003/0212486 A1 * | 11/2003 | Hughes et al. | ............... | 701/204 |
| 2005/0114014 A1 * | 5/2005 | Isaac | ............... | 701/204 |
| 2005/0119927 A1 * | 6/2005 | Patel | ............... | 705/8 |
| 2005/0227712 A1 * | 10/2005 | Estevez et al. | ............... | 455/456.3 |

FOREIGN PATENT DOCUMENTS

JP 2004-61236 * 2/2004

OTHER PUBLICATIONS

Steve Raney; Suburban Silver Bullet: PRT Shuttle + Wireless Commute Assistant Using Cellular Location Tracking; Apr. 2004; http://faculty.washington.edu.*

* cited by examiner

*Primary Examiner*—Michael J. Zanelli

(57) ABSTRACT

Rendezvous tracking subsystem uses GPS-enabled cell phones communicating with an application server for tracking the whereabouts of carpool participants and for providing on-time status of participants en-route to designated rendezvous points. Safety subsystem can be used to verify safe arrival of participants at carpool destinations. Participants can configure safety subsystem by defining escalation rules and procedures to follow when safety critical events occur.

3 Claims, 4 Drawing Sheets

METHOD FOR GPS CARPOOL RENDEZVOUS TRACKING AND PERSONAL SAFETY VERIFICATION

BACKGROUND OF THE INVENTION

1. Field of the Invention

This invention relates to: a) location tracking of people and b) carpooling

2. Description of Prior Art

2A. Rendezvous Tracking Prior Art

Published U.S. Patent Application 20020177943. Nov. 28, 2002. Beardsworth.

This "schedule activated management system for optimizing aircraft arrivals at congested airports" tracks a multi-airplane convergence (or rendezvous) with staggered arrival at a destination. In contrast, the present invention tracks desired simultaneous arrival at a destination. The communications technology described in Beardsworth is specialized for airplanes, whereas the present invention uses widely available consumer wireless communications technology. The transportation system in Beardsworth is air transportation, whereas the present invention uses surface transportation.

U.S. Pat. No. 6,006,159. Dec. 21, 1999. Kenneth J. Schmier, et al.

Bus stop systems in Schmier display "time to next bus" to reduce uncertainty stress for transit passengers at a bus stop, but do not address the multiple convergence of persons traveling to a rendezvous point.

U.S. Pat. No. 6,356,838. Mar. 12, 2002. Paul Sunil.

Sunil's "System and method for determining an efficient transportation route" relates to an improved system and method for providing transportation services over a data communications network. It assists in the convergence between a single pedestrian and a pickup vehicle, but does not encompass a multiple convergence.

U.S. Pat. No. 5,808,565. Sep. 15, 1998. Matta and Kissel.

Matta and Kissel's "GPS triggered automatic annunciator for vehicles" announces to bus passengers that the bus has arrived at a predetermined destination, but does not provide tracking information en-route to the destination, nor does it track a multiple convergence.

U.S. Pat. No. 5,243,529. Sep. 7, 1993. Kashiwazaki.

Kashiwazaki displays the next destination for a delivery vehicle using a GPS receiver. Thus it assists the tracking of a delivery truck and its destinations, but does not track a multiple convergence.

U.S. Pat. No. 5,760,742. Jun. 2, 1998. Janky, et al.

The vehicle dispatch system of Janky integrates mobile GIS/GPS/AVL (Automatic Vehicle Location) with wireless messaging capability. This does not track a multiple convergence.

Common Consumer Solution

Some carpool participants share on-time status information via a series of informal cell phone calls between participants. The present invention automates the collection of status information, providing a current status while en-route. The present invention can ensure the status information is available when participants seek it, such as when they stop at a stoplight and have time to glance at their cell phone display. In contrast, the common consumer solution requires the participant to manually obtain status information.

2B. Safety Subsystem Prior Art

U.S. Pat. No. 6,362,778. Mar. 26, 2002. Nehar.

Nehar is a GPS-based personal locator system with panic button and tamper detection. U.S. Pat. Application 2004198382, by Wong, published on Oct. 7, 2004, is a similar personal locator system. The present invention's safety subsystem represents a unique evolution to verify safe arrival during scheduled "high-risk" trips with strangers. The present invention represents a more "task-specific" application of the wireless location technology. The present invention's use of participant-configurable escalation rules and procedures is also different.

Common Consumer Solution

An interested party, such as a spouse, may call a carpool participant to verify that the participant arrived home safely. The present invention automates this process, and can raise an alarm when a participant does not arrive at their scheduled arrival time.

SUMMARY OF THE PRESENT INVENTION

1. Invention Benefits

The present invention can make carpools run more smoothly, reliably, and precisely, while off-loading time-consuming manual tasks. Using cellular geolocation telecommunications technology, the present invention can increase considerate behavior and time utilization. In addition, the present invention can assure safe operation for carpools amongst strangers, providing a substantial deterrent to personal assault and kidnapping.

Stop-and-go traffic delay is expected to increase dramatically in the near future. An increase in carpooling will reduce traffic congestion by increasing the occupancy of cars, increasing the efficiency of the road network. A number of psychological barriers prevent an increase in carpooling. Surveys have shown that carpool reliability and "uncertainty stress" score as a major barrier to be overcome, and the present invention scores high as an effective solution to these barriers. "Uncertainty occurs" because participants do not know whether other participants are on-time. Dr. Susan Shaheen conducted research that showed that concerns over carpool safety represented another large barrier to increased carpooling. The present invention's safety subsystem addresses this barrier and others.

Thus the present invention can be used to:

Increase carpooling nationally by overcoming reliability and uncertain stress barriers Increase carpooling nationally by overcoming safety concerns.

Benefits from carpooling include: reduced cost-of-living for participants due to reduced vehicle operation, reduced greenhouse gas emissions compared to solo driving, and traffic congestion reduction. Once solo drivers switch to carpooling, they often read or sleep while participating as a passenger, making better use of their time.

2. Invention Description

A multi-participant carpool encounters complex morning choreography. Each commuter may travel from home to a rendezvous point (often a shopping center parking lot). From there, carpool participants can board a single car for the rest of the journey. The present invention can serve as a "security blanket" for carpoolers, who typically encounter a major carpooling problem every 2 months, and a minor irritant about once per week. A previously independent solo commuter, who switches to carpooling, finds herself dependent on her carpool partners of uncertain reliability. The present invention can remove this uncertainty, making the carpooling experience more palatable to switchers. The present invention can provide a frequently updated graphical depiction of the status of the commute partners.

In carpooling, being on time at the pickup spot is the considerate thing to do. The present invention can monitor progress to the pickup spot, graphically highlighting laggards while en-route. Thus, positive and negative performance feedback may be glaringly apparent, naturally generating increased social pressure to be punctual.

Without the present invention, improving punctuality can often require personal confrontation. Some existing carpools implement a "5 minutes late cut-off rule." In the morning, if a carpooler is 5 minutes late to the rendezvous spot, other participants leave without the laggard. The present invention can provide a gentler method to encourage courteousness by providing a standardized, impersonal measuring system.

In addition, the present invention can facilitate the considerate action of informing other participants that the carpool will be delayed a certain number of minutes. The present invention can reduce an individual's ability to make up excuses for tardiness. Says one potential user, "I don't need a reminder to leave. I only need confirmation that others are moving reliably towards the carpool meeting point. One of my carpool participants needs special nudging about once every 10 days."

Time utilization is an issue at the end of the workday, before the evening pickup. The present invention can also track the end of day "race" to the meeting point. Says a second potential user, "Making things a little smoother would be great. If I knew someone was running even a few minutes behind, and I'm in the middle of something, then that few minutes would buy me enough time to finish what I'm doing, rather than thinking 'Oh Gosh I have to shut down because I don't want someone to wait.'" One benefit can be in knowing exactly when to shut down and reducing stress in wondering whether everyone else is shutting down.

The safety subsystem can verify that a carpooler arrives home safely via GPS location tracking that is cross-checked against scheduled arrival time. When a safety critical event occurs, such as when a participant has not reached home within a certain number of minutes after scheduled arrival, escalation procedures and rules can be followed either to verify that the participant is safe or to contact the police to take appropriate action. Dr. Shaheen's research showed that safety considerations score highly in carpool focus groups, for both women and men. Even college students, representing a somewhat homogenous community, are loathe to step into a car with a stranger.

DESCRIPTION OF PREFERRED EMBODIMENT

1. Definition of Terms

"Surface transportation" means travel on the earth's surface and does not encompass air travel or underwater travel. Surface transportation modes include: cars, vans, buses, trains, bicycles, boats, and walking.

A "multi-path rendezvous" is two or more trips following two or more different paths and converging on the same destination.

A "carpool" is when two or more people share a trip in the same vehicle between an origination area and a destination area. To reach the origination area pickup location, carpool participants may have a multi-path rendezvous. Once in the destination area, participants may then journey onward to separate locations.

2. Rendezvous Tracking Preferred Embodiment

Figure 1:
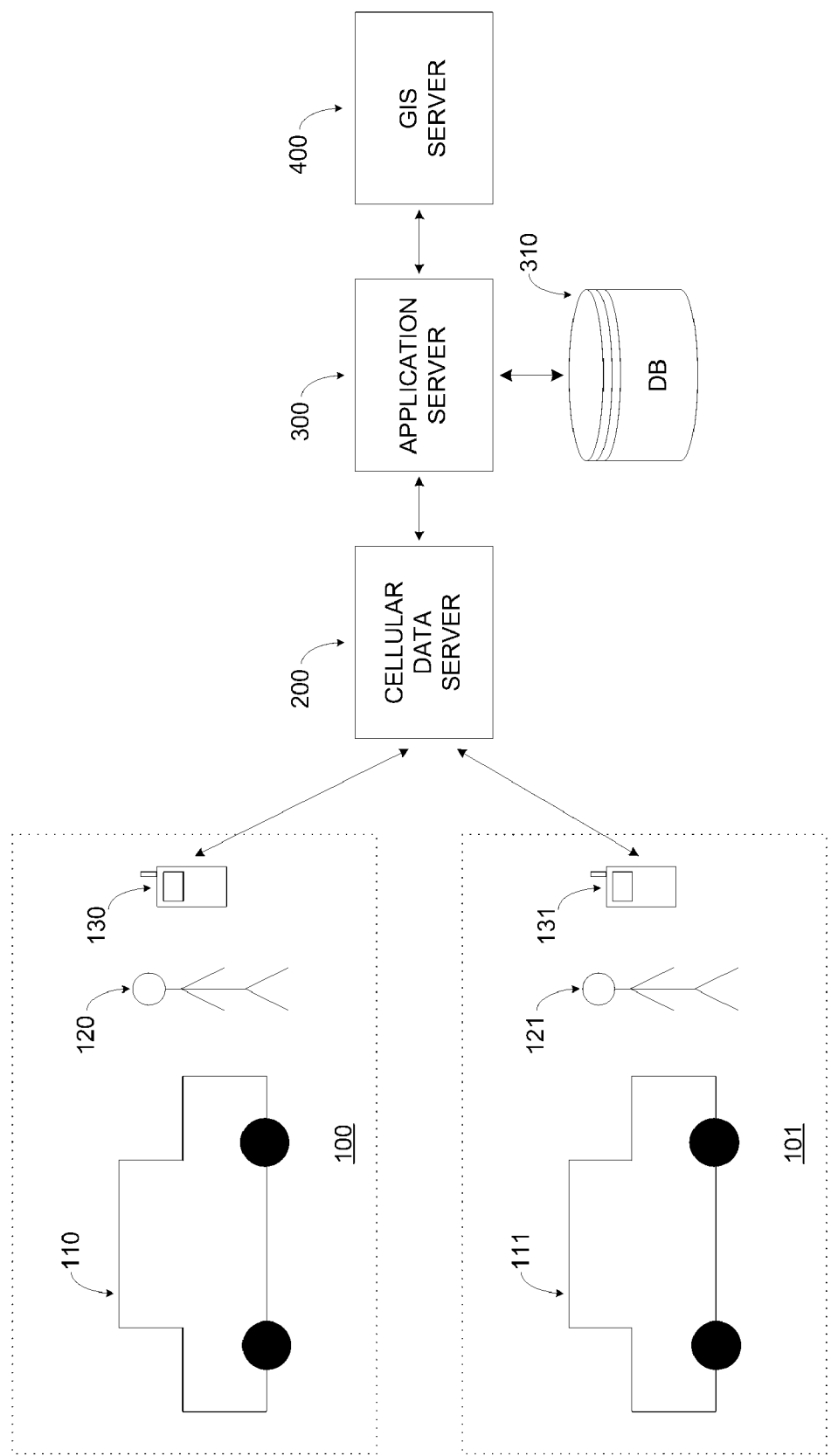
FIG. 1 is a system block diagram depicting: two carpool participants with GPS-enabled cell phone handsets and cars, wireless data communications between the cell phones and the cellular data server, an application server that communicates with the cellular data server and GIS server, and the GIS (geographic information systems) server.

Turning to the system block diagram in FIG. 1. For the morning rendezvous, a participant 120 with a GPS-enabled cell phone 130 drives a car 110 from home residence to the rendezvous point. The participants, cell phone handset, and car comprise a single logical unit 100 that moves from home to the rendezvous point. A multiplicity of such logical units may participate in the morning rendezvous. FIG. 1 shows two such logical units 100, 101.

The handsets communicate with the application server 300 over the cellular data network. Data communications from the cell phone 130 passes through the cellular data server 200 before reaching the application server. For communications from the application server to the handset, the process is reversed. The application server relies on a database 310 with configuration information about individual carpools. Tracking subsystem database data includes: longitude/latitude of rendezvous point, scheduled morning rendezvous time, on-time performance profiles of carpool participants, participant cell phone numbers, etc. Safety subsystem database data includes: participant selections for escalation rules and procedures, and "address data" to make contact with the participant's trusted social sphere. The application server queries the GIS server 400 to estimate the travel time from a participant's current position to the rendezvous point. The GIS server uses a street grid geodatabase with travel times associated with each street segment to calculate trip durations.

Figure 2:
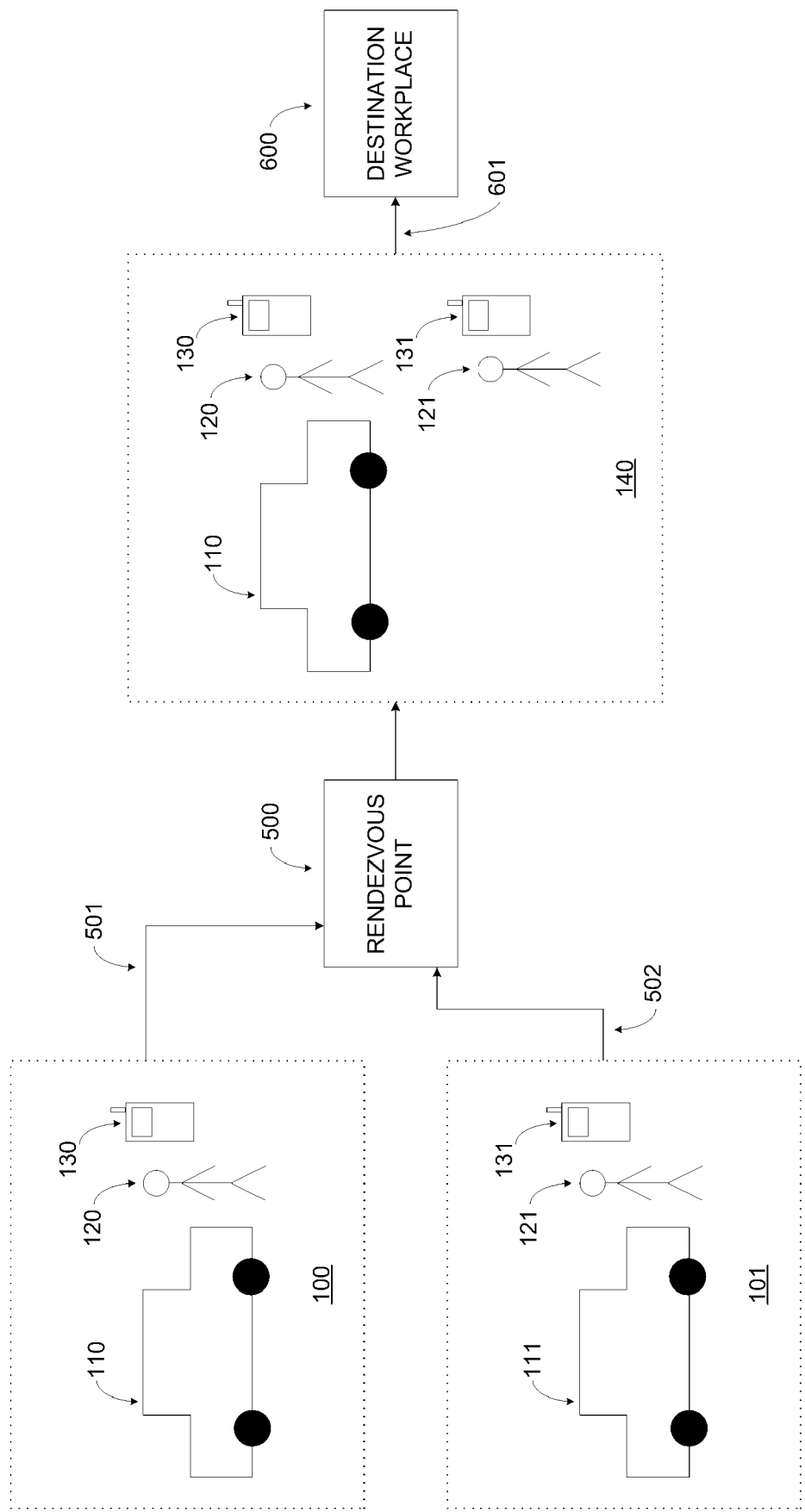
FIG. 2 shows the morning convergence of two participants who drive to a rendezvous point via different travel paths and then transfer to a single car for the ensuing journey to the destination workplace.

FIG. 2 shows how two participants converge on the rendezvous point 500. Logical unit 100 travels along the travel path 501 to the rendezvous point. Logical unit 101 travels along the travel path 502 to the rendezvous point. At the rendezvous point, participant 121 transfers to participant 120's car, creating a logical unit 140 with a single car, two participants, and their handsets. This logical unit travels along travel path 601 from the rendezvous point to the destination workplace 600.

Figure 3:
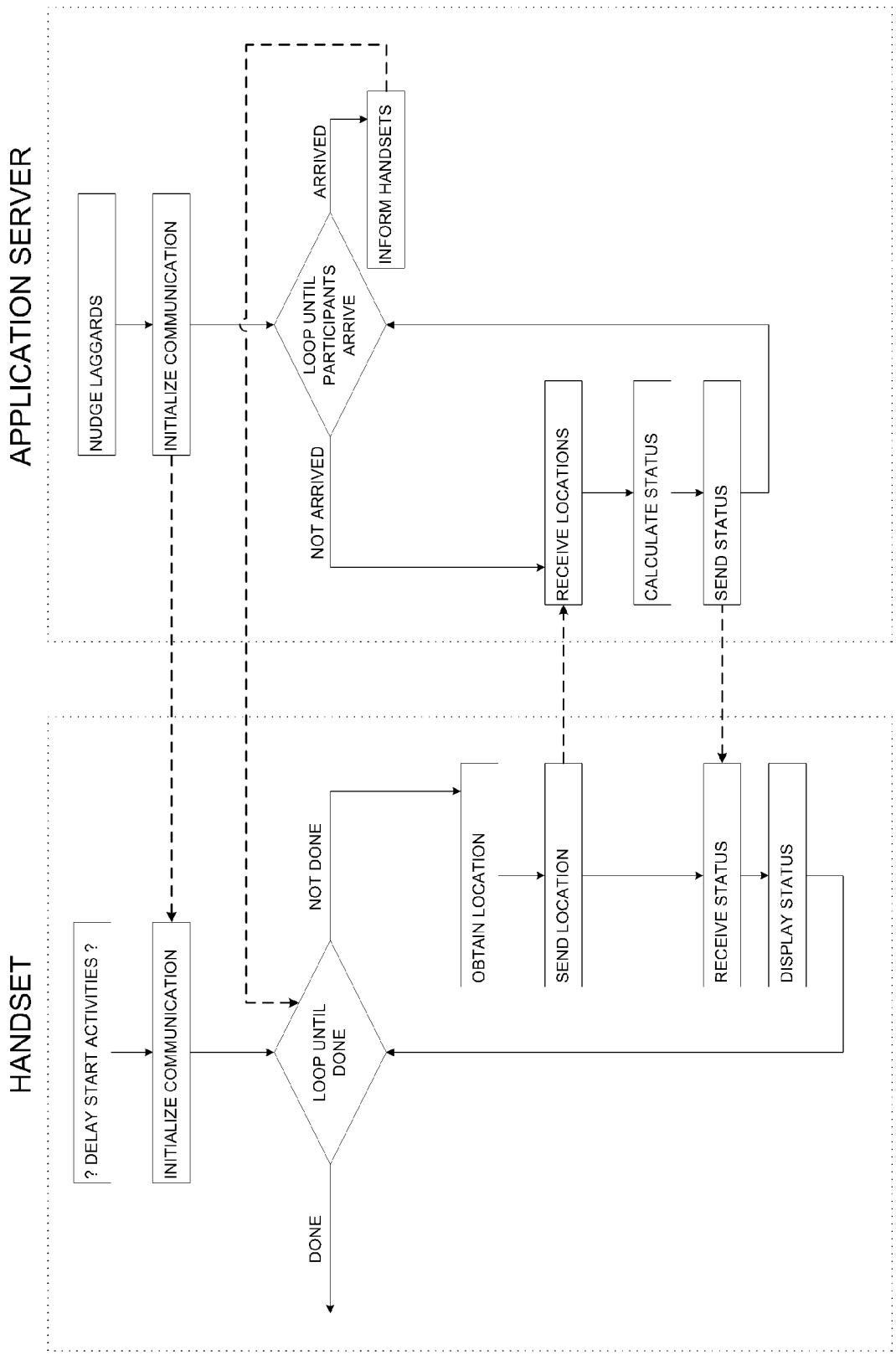
FIG. 3 shows flowcharts for cell phone handset and application server software, depicting communications between the two.

FIG. 3 shows flowcharts of handset and application server software. Multiple handsets operate simultaneously, communicating with a single application server. The left side of the figure shows the handset 130, 131 software:

DELAY START ACTIVITIES?—As an irregular occurrence, before the morning rendezvous run has started, a participant may realize it is impossible to arrive at the rendezvous point on-time. With a few key presses, the handset software allows a participant to notify all other carpool participants to delay the scheduled rendezvous time by a selected number of minutes. The handset will communicate the information to the application server, and the application server will use robust, automated communications to notify all other participants of the change in schedule. As part of the robust communications, the application server will re-send the message to participants periodically until a confirmation reply is obtained. An option for a participant to cancel participation in the morning rendezvous will also be supported.

Figure 4:
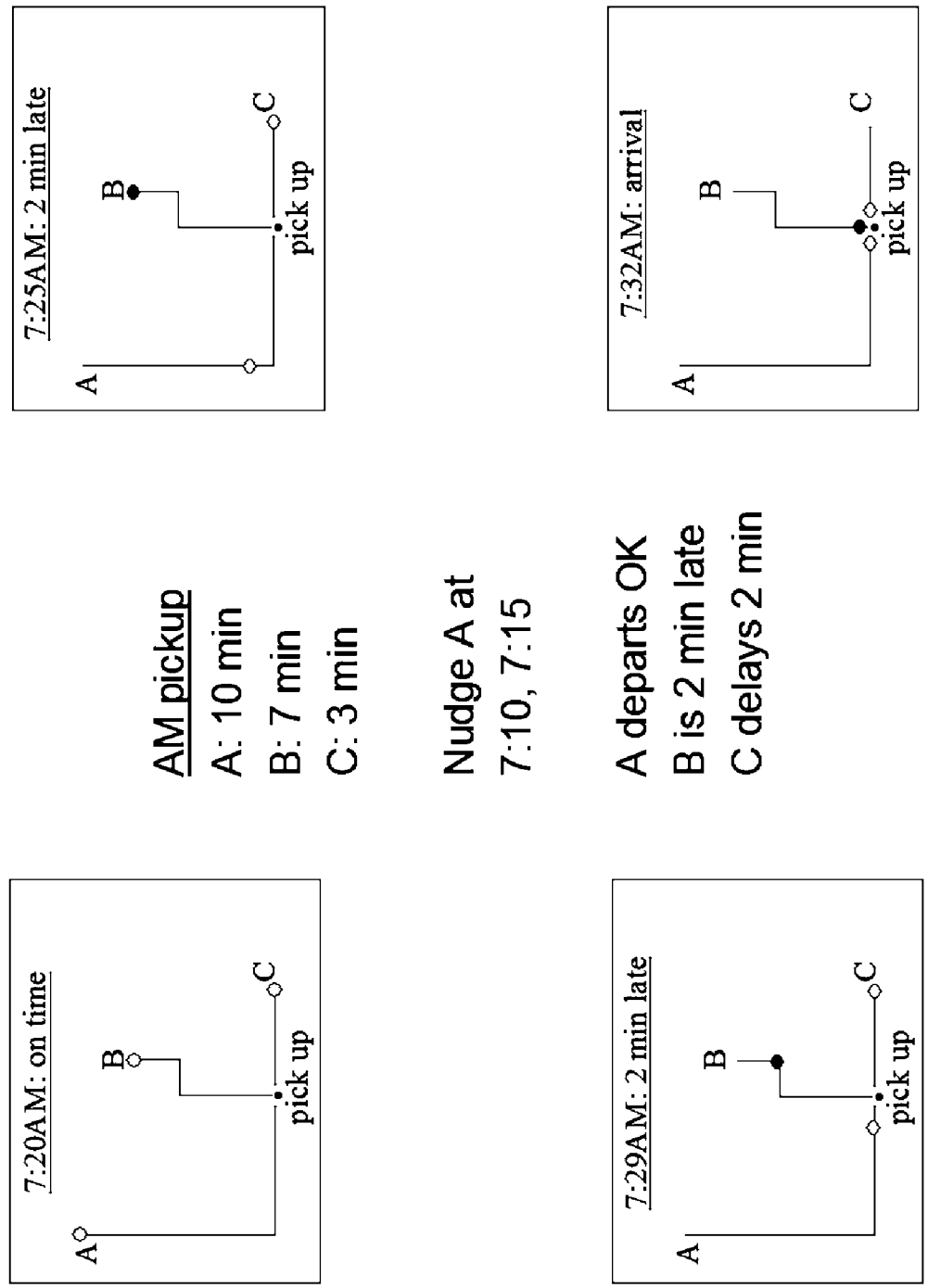
FIG. 4 shows the cell phone handset display at four different points in time during the morning convergence, for a three-participant carpool.

INITIALIZE COMMUNICATION—The handset's date book is configured to initiate the handset application software when the morning rendezvous awakening time is reached. Awaken time is calculated as follows:

- Calculate the trip duration from home to rendezvous point for all participants. In the example given in FIG. 4, these durations are 10, 7, and 3 minutes. Trip durations are calculated using the GIS server 400.
- Obtain the maximum of all the trip durations. In FIG. 4, this is 10 minutes.
- Subtract this maximum from the desired rendezvous time. In FIG. 4, the desired rendezvous time is 7:30 AM, thus the awaken time is 7:20 AM.

The application server 300 sends handsets initialization information, including a bounding longitude/latitude rectangle for the area encompassing all carpooler home locations and the rendezvous location.

LOOP UNTIL DONE—The handset software will loop with cycle time of 30 seconds until the application server communicates that the participants have arrived.

- OBTAIN LOCATION—The handset software invokes the "get GPS location" function, which returns high-resolution longitude and latitude of the participant's location.
- SEND LOCATION—The handset sends its GPS location to the application server.
- RECEIVE STATUS—The application server sends each handset an information packet with the location of each participant and a status for each: {comfortably on-time, slightly ahead of schedule or behind schedule, late}.
- DISPLAY STATUS—Four sample handset displays are shown in FIG. 4. The display shows the relative progress of participants towards the rendezvous point. To convey status information, a solid black circle is displayed for late and a white circle with black outline is displayed for on-time. Longitude/latitude coordinates are scaled so that they fit on the screen. The bounding longitude/latitude rectangle plots to the screen edge.

Handset application shutdown is not shown in the flow chart. Once the application server indicates that all participants have arrived, the handset application leaves the final display unchanged for five minutes, then exits.

The right side of FIG. 3 shows the application server 300 software:

NUDGE LAGGARDS—If designated on-time performance rules warrant, identify participants as laggards who need gentle coaxing to keep them on-time. An example of a performance rule follows: when the database reflects that a participant has been late three times in a month, that person is considered a laggard. Once a laggard is identified, the application server sends short message service (SMS) messages to their handset at ten and then five minutes before their "leave the house" time.

INITIALIZE COMMUNICATION—Upon "awaken time" for the morning rendezvous, the application server queries the database 310 for desired rendezvous time and bounding longitude/latitude rectangle for the area encompassing all participant home locations and the rendezvous location. This data is sent to all handsets.

LOOP UNTIL PARTICIPANTS ARRIVE—The application server will loop with cycle time of 30 seconds. If participants are within a designated distance of the rendezvous point, exit the loop.

- RECEIVE LOCATIONS—Receive current location from all participants.
- CALCULATE STATUS—For each participant, calculate the expected duration of the remainder of the trip to the rendezvous point. The application server queries the GIS server, providing current location and rendezvous location as input. The GIS server calculates the expected trip duration using a street travel time database. These GIS calculations are readily available. By requesting driving directions from mapquest.com, anyone can obtain estimated trip duration, broken down by street segments. Given expected remaining trip duration for each participant, calculate on-time status: {comfortably on-time, slightly ahead of schedule or behind schedule, late}. On-time status is calculated by comparing {desired rendezvous time minus remaining trip duration} to current time. Slightly ahead/behind is calculated using designated thresholds, such as 30 seconds ahead and 90 seconds behind.
- SEND STATUS—The application server sends each handset an information packet with the location of each participant and a status for each: {comfortably on-time, slightly ahead of schedule or behind schedule, late}.

INFORM HANDSETS—Inform handsets that the participants have arrived and exit the server application, logging on-time performance data to the database.

FIG. 4 provides an example of a morning rendezvous between three participants: {A, B, and C}. The desired rendezvous time at a shopping center parking lot is 7:30 AM. Trip durations from home to the rendezvous point are 10 minutes for A, 7 minutes for B, and 3 minutes for C. For standard on-time operation, A leaves at 7:20 AM, B leaves at 7:23 AM, and C leaves at 7:27 AM.

Person A has a history of being late and has been designated as a laggard. The present invention nudges A at 7:10 AM and 7:15 AM.

The handset display is shown at 7:20, 7:25, 7:29, and 7:32 AM. Person A departs on time, but B departs 2 minutes late.

The handset display shows the previous paths that A, B, and C have taken to access the pickup point. A, B, and C all see the same display as the pickup process progresses. At 7:20 AM, all three are on time, at home, and A is ready to depart.

At 7:25 AM, B is still at home, even though he should have left at 7:23 AM, so his dot his shown in red to indicate lateness, and the carpool is shown as being 2 minutes late. A's progress towards the shopping center is apparent.

C should normally depart at 7:27 AM, but C sees that the carpool is two minutes late and has another cup of coffee. At 7:29 AM, C departs. A and B have made progress and B's status is still late.

At 7:32 AM, all participants have arrived at the meeting point.

3. Safety Subsystem Preferred Embodiment

When configuring the safety subsystem, participants assign escalation rules and procedures to safety critical events.

FIG. 2 shows the journey from the rendezvous point 500 to the destination workplace 600. "Worry time" is an important safety concept, and is defined as scheduled arrival time at destination workplace plus a participant-selected buffer time, such as 10 minutes. On this journey there are a number of safety critical events that may occur:

Unknown participant location. This event may occur before or after worry time. Potential causes include: the participant's handset's battery discharges, the participant has turned the handset off, or an assailant has turned the participant's handset off.

Participant arrives at destination workplace. This event may occur before the worry time, but the participant may configure the safety subsystem to require a confirming response, to verify that the participant feels safe at their destination.

Worry time has passed, but participant is moving towards the destination workplace.

Worry time has passed and participant is not moving towards destination workplace.

Other carpool participants do not successfully turn tracking on when requested.

The participant may assign escalation procedures to critical events. Examples of escalation procedures follow:

Contact "trusted social sphere" via automated communication. The trusted social sphere includes people the participant believes a) may have information as to the participant's whereabouts and b) can be trusted. Examples of people within a participant's social sphere could include parents, close friends, and co-workers. Automated methods would include such techniques as sending e-mail to social sphere members, requesting specific reply codes indicating whether the participant is safe and accounted for, is delayed a certain number of minutes, or has unknown safety status. Other automated methods would include sending SMS messages to cell phones requesting specific reply codes. Two-way pagers can also supply this functionality. Automated voice response telephony systems can also supply this functionality. Participants will provide appropriate contact information for the social sphere as part of safety subsystem configuration. The application server 300 will handle outbound communication, collect responses, and obtain contact information from the database 310.

Contact trusted social sphere via manual communication. Safety system personnel will pursue additional avenues to contact the participant and to contact the social sphere, such as via telephone "land lines." Safety personnel will query the database for appropriate contact information.

Request that other carpool members turn tracking communication on with the application server by running a small tracking and communications software application on their handset. The application server will make this request via automated SMS communication.

Request that the participant enter in a private reply code on the handset to an SMS safety status request from the application server. One reply code will designate that the participants believes they are safe, a second code will indicate "panic," which means send the police as soon as possible.

Contact the police with an urgent request to locate the participant.

Add a designated number of minutes to the worry time (because the participant is making progress towards the destination) and take no other action except to continue running the safety subsystem.

Have the participant snap a picture with a camera cell phone and send it to safety system personnel for safety verification.

Escalation rules define the timing and priority of escalation procedures once a safety critical event has occurred. For example, when the critical event "unknown participant location" occurs, rules may trigger a series of escalation procedures. After five minutes have elapsed, the procedure "contact trusted social sphere via automated communication" may be invoked. If 15 minutes elapse with no affirmative automated communication, the procedure "contact trusted social sphere via manual communication" may be invoked.

Once a participant's status changes from "not known to be safe" to "presumed safe," the application server will automatically notify people who were brought in on the search.

Alternate Embodiments

Although the description above contains many specificities, these should not be construed as limiting the scope of the present invention but as merely providing an illustration of the presently preferred embodiment of this invention. Thus, the scope of the present invention should be determined by the supplied claims.

Variations are as follows:

The preferred embodiment uses GPS-enabled cell phones, but other wireless communications devices using different location tracking technology can also work, such as personal digital assistants with GPS daughter cards and cell phones that obtain location information from triangulation of cellular antenna towers.

The preferred embodiment describes the application server interacting with a single carpool, but it is desirable for the server to be scaled up to support many carpools.

The application server may support more than one cellular carrier, even when carriers use different location tracking technologies.

The preferred embodiment description of the tracking subsystem emphasized the morning commute rendezvous, but the subsystem can also work well for the evening rendezvous. Likewise, the tracking subsystem can work well for any rendezvous by more than one person with a GPS communications device, not for carpooling only. Cars do not have to be involved. For example, the convergence of friends moving on foot towards a movie theatre may be effectively tracked. Likewise, the safety subsystem may be deployed to verify safety of any journey of interest, not just commute trips, and not just car trips.

Where carpools drop people off at different destination workplaces, the evening rendezvous becomes more complex. A three-person carpool with participants {A, B, and C} may exhibit a number of different variations for the evening rendezvous, and these variations may vary depending which participant's car is being used on a particular day. Variations may include: {A picks up B, then picks up C}, {C picks up B, then picks up A}, and {A & B walk to same spot, and C picks them both up}. All these variations may be easily appreciated by one skilled in the art and accommodated by the present invention. By tracking at which of the different destination workplaces the car is parked at, the pick up choreography may be surmised. The database can provide multiple evening rendezvous tracking profiles for the different workplace destinations. To ascertain where the car is parked, the fact that cars move faster than pedestrians is used. The last handset(s) to move faster than five mph near the destination workplace indicates where the carpool car is parked.

The present invention can work well for vanpools with from 4 to 20 participants and employ a user interface modification to display progress bars for each participant, rather than a two-dimensional tracking map.

The timing of communications between the handset and the application server in FIG. 3 may be oversimplified for some cellular carrier location tracking implementations. Asynchronous communications may be in order.

The GIS server can use a street grid geo-database with travel times associated with each street segment to calculate trip durations. Some GIS servers can also process real-time traffic flow information to provide a more accurate calculation of trip duration.

Travel time calculations can be made in many ways. A method that eliminates the need for a GIS server stores historical data from previous rendezvous runs in the database, associating clock time with a series of checkpoints along the travel path to the rendezvous point. From these past history checkpoints, on-time status for the current run may be obtained.

For some sets of serpentine travel paths, the bounding longitude/latitude rectangle may have to be extended to encompass all participants travel paths.

For the tracking subsystem, if a participant requests a delay of 5 minutes, an option could be provided to allow participants to debate whether or not to wait for that person. Likewise, certain cellular carriers provide walkie-talkie functionality, so a participant conference call may be easily accommodated.

What is claimed is:

1. A method using automated location tracking technology for coordinating a multi-path rendezvous with a desired meeting time between two or more people using surface transportation, comprising the steps of:
   a) tracking the location of each person while en route;
   b) calculating status of whether each person is on-time or late while persons are en route; and
   c) providing visual feedback on a communications device to all participants on the status of all participants, indicating whether said participants are on-time or late, and indicating said participants' progress in traveling from starting location to the rendezvous location.

2. A method to identify participants in a multi-path rendezvous who are laggards and to initiate additional communication with them, comprising the steps of:
   a) recording in a database whether persons are on-time or late over a period of time;
   b) identifying laggards based on performance rules; and
   c) communicating with said laggards a few minutes before the start of the multi-path rendezvous
   whereby said laggards will be encouraged to reduce lateness.

3. A method to verify that an identified person traveling with one or more people arrives safely at said person's desired destination at a desired arrival time, comprising the steps of:
   a) establishing a series of pre-defined procedures and escalations to undertake based on the occurrence of specified events;
   b) tracking the location of said person while en route, using automated location tracking technology; and
   c) calculating the occurrence of specified events while en route, and initiating pre-defined procedures and escalations in response to the specified events.

* * * * *